(12) United States Patent
Wang et al.

(10) Patent No.: US 9,924,569 B2
(45) Date of Patent: Mar. 20, 2018

(54) LED DRIVING CIRCUIT

(71) Applicant: Silergy Semiconductor Technology (Hangzhou) LTD, Hangzhou, ZheJiang Province (CN)

(72) Inventors: Jianxin Wang, Zhejiang Province (CN); Hongbin Lai, Zhejiang Province (CN); Wei Chen, Saratoga, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 134 days.

(21) Appl. No.: 15/194,070

(22) Filed: Jun. 27, 2016

(65) Prior Publication Data

US 2017/0027030 A1    Jan. 26, 2017

(30) Foreign Application Priority Data

Jul. 24, 2015  (CN) .......................... 2015 1 0441957

(51) Int. Cl.
*H05B 33/08* (2006.01)

(52) U.S. Cl.
CPC ....... *H05B 33/0815* (2013.01); *H05B 33/086* (2013.01); *H05B 33/0827* (2013.01); *Y02B 20/347* (2013.01)

(58) Field of Classification Search
CPC .............. H05B 33/0815; H05B 33/083; H05B 33/0845; H05B 33/0857; H05B 33/0827; H05B 33/086; H05B 33/0887; H05B 33/0812; Y02B 20/347
See application file for complete search history.

(56) References Cited

U.S. PATENT DOCUMENTS

| | | | |
|---|---|---|---|
| 8,692,471 B2 * | 4/2014 | Seo .................... | H05B 33/0818 |
| | | | 315/186 |
| 8,773,041 B2 | 7/2014 | Chen | |
| 8,796,957 B2 * | 8/2014 | Shin ................... | H05B 33/0827 |
| | | | 315/185 S |
| 9,018,849 B2 | 4/2015 | Han et al. | |
| 9,024,542 B2 | 5/2015 | Chen | |
| 9,066,397 B2 * | 6/2015 | Shteynberg ........ | H05B 33/0815 |
| 9,107,270 B2 | 8/2015 | Chen | |
| 9,295,117 B2 * | 3/2016 | Acatrinei ........... | H05B 33/0815 |

(Continued)

FOREIGN PATENT DOCUMENTS

| | | |
|---|---|---|
| CN | 103458578 A | 12/2013 |
| WO | 2015196832 A1 | 12/2015 |

*Primary Examiner* — Haissa Philogene
(74) *Attorney, Agent, or Firm* — Michael C. Stephens, Jr.

(57) ABSTRACT

An LED driving circuit for driving an LED load including N LED strings, where N is a positive integer no less than 2, can include: (i) a power converter having a power switch; (ii) a constant current control circuit that controls a switching operation of the power switch such that the power converter generates a driving current for the LED load; (iii) N control switches respectively coupled in series to the N LED strings; (iv) a PWM signal generator configured to generate N color tuning PWM signals; and (v) a color tuning control circuit configured to output N switching control signals according to the N color tuning PWM signals, to control switching operations of the N control switches, to regulate a ratio of a current through each LED string of the LED load to the driving current, and to regulate the color temperature of the LED load.

20 Claims, 4 Drawing Sheets

(56) References Cited

U.S. PATENT DOCUMENTS

2007/0228994 A1   10/2007  Hung et al.
2013/0002159 A1    1/2013  Chen et al.
2015/0373790 A1* 12/2015  Boswinkel ........... H05B 33/083
                                                          315/186

* cited by examiner

US 9,924,569 B2

LED DRIVING CIRCUIT

RELATED APPLICATIONS

This application claims the benefit of Chinese Patent Application No. 201510441957.4, filed on Jul. 24, 2015, which is incorporated herein by reference in its entirety.

FIELD OF THE INVENTION

The present invention generally relates to the field of the power electronics, and more particularly to an LED driving circuit.

BACKGROUND

Light-emitting diode (LED) lighting is becoming increasingly used in various lighting applications due to its inherent advantages of relatively high light efficiency, relatively long life time, and relative environmental friendliness. LED dimming methods or approaches may include direct current dimming and pulse-width modulation (PWM) dimming. PWM dimming may be used in many applications due to fixed light color, and relatively good stability at low luminance, for example.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
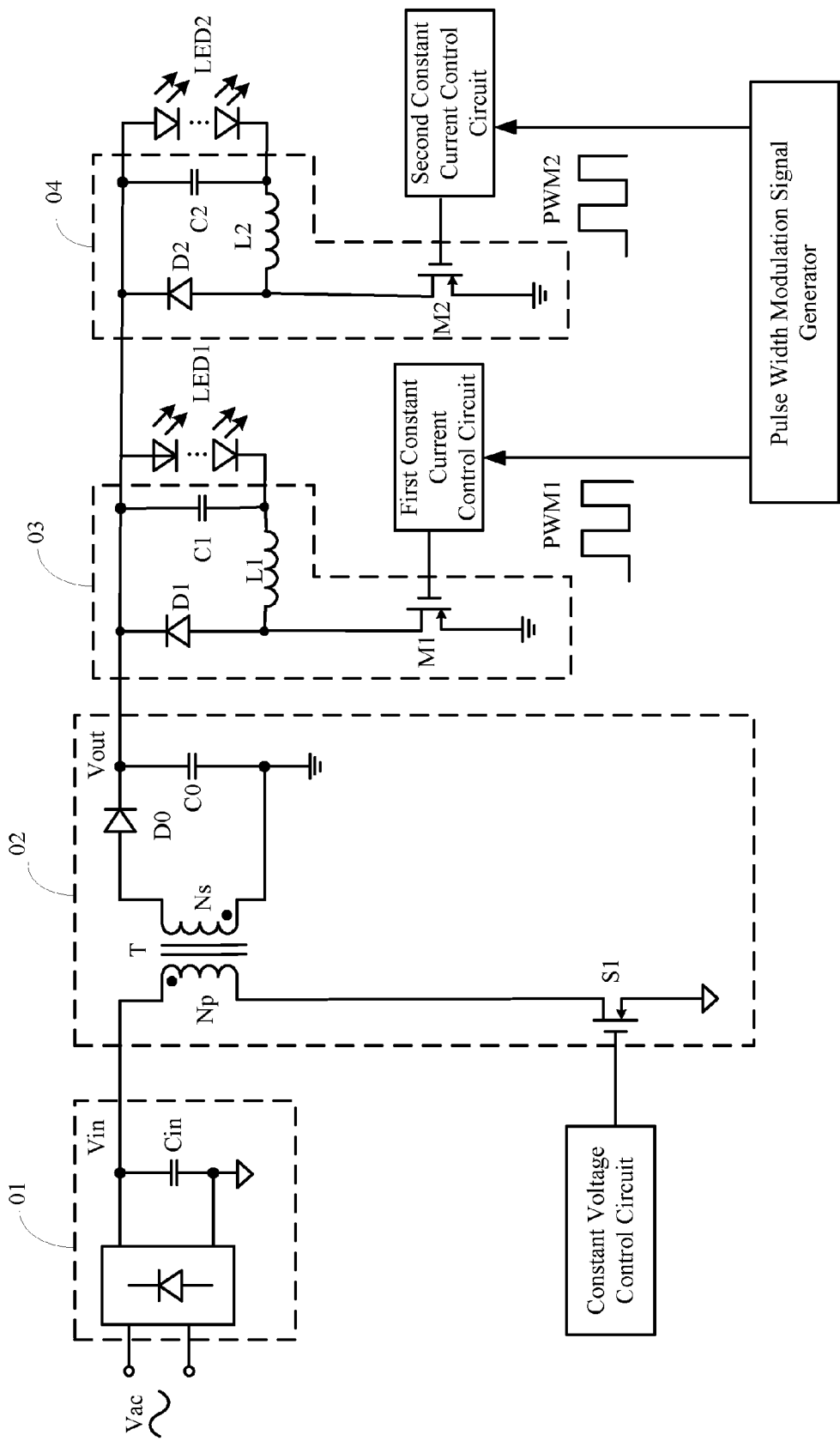
FIG. 1 is a schematic block diagram of an example LED driving circuit.

Referring now to FIG. 1, shown is a schematic block diagram of an example LED driving circuit. For some lighting applications, not only the brightness but also the color temperature of an LED light may be regulated. In such a case, AC voltage Vac can be converted to voltage Vin by rectifier and filter circuit 01. Power converter 02 can receive voltage Vin, and may generate constant voltage Vout as an input voltage of constant current driving circuits 03 and 04 under the control of a constant voltage control circuit. The first constant current control circuit can control constant current driving circuit 03, in order to generate a constant driving current for LED string LED1 having a "cool" color. The second constant current control circuit can control constant current driving circuit 04 in order to generate a constant driving current for LED string LED2 having a "warm" color. Constant current driving circuits 03 and 04 can receive pulse width signals PWM1 and PWM2 from the pulse width modulation signal generator, in order to control an average current of LED strings LED1 and LED2, so as to achieve brightness dimming and color tuning of an LED light.

However, the LED driving circuit may need an independent constant current driving circuit for each LED string having a certain light color, and each constant current driving circuit may be controlled by a constant current control circuit. As a result, the overall circuit structure is relatively complex. In addition, such brightness dimming and color tuning circuitry may have a relatively large number of electronic components because the constant current driving circuit is typically built by several energy storage elements. Thus, associated production costs may be relatively high, and the system size relatively large, making integration difficult.

An LED driving circuit for driving an LED load including N LED strings, where N is a positive integer no less than 2, can include: (i) a power converter having a power switch; (ii) a constant current control circuit that controls a switching operation of the power switch such that the power converter generates a driving current for the LED load; (iii) N control switches respectively coupled in series to the N LED strings; (iv) a PWM signal generator configured to generate N color tuning PWM signals; and (v) a color tuning control circuit configured to output N switching control signals according to the N color tuning PWM signals, to control switching operations of the N control switches, to regulate a ratio of a current through each LED string of the LED load to the driving current, and to regulate the color temperature of the LED load.

Figure 2:
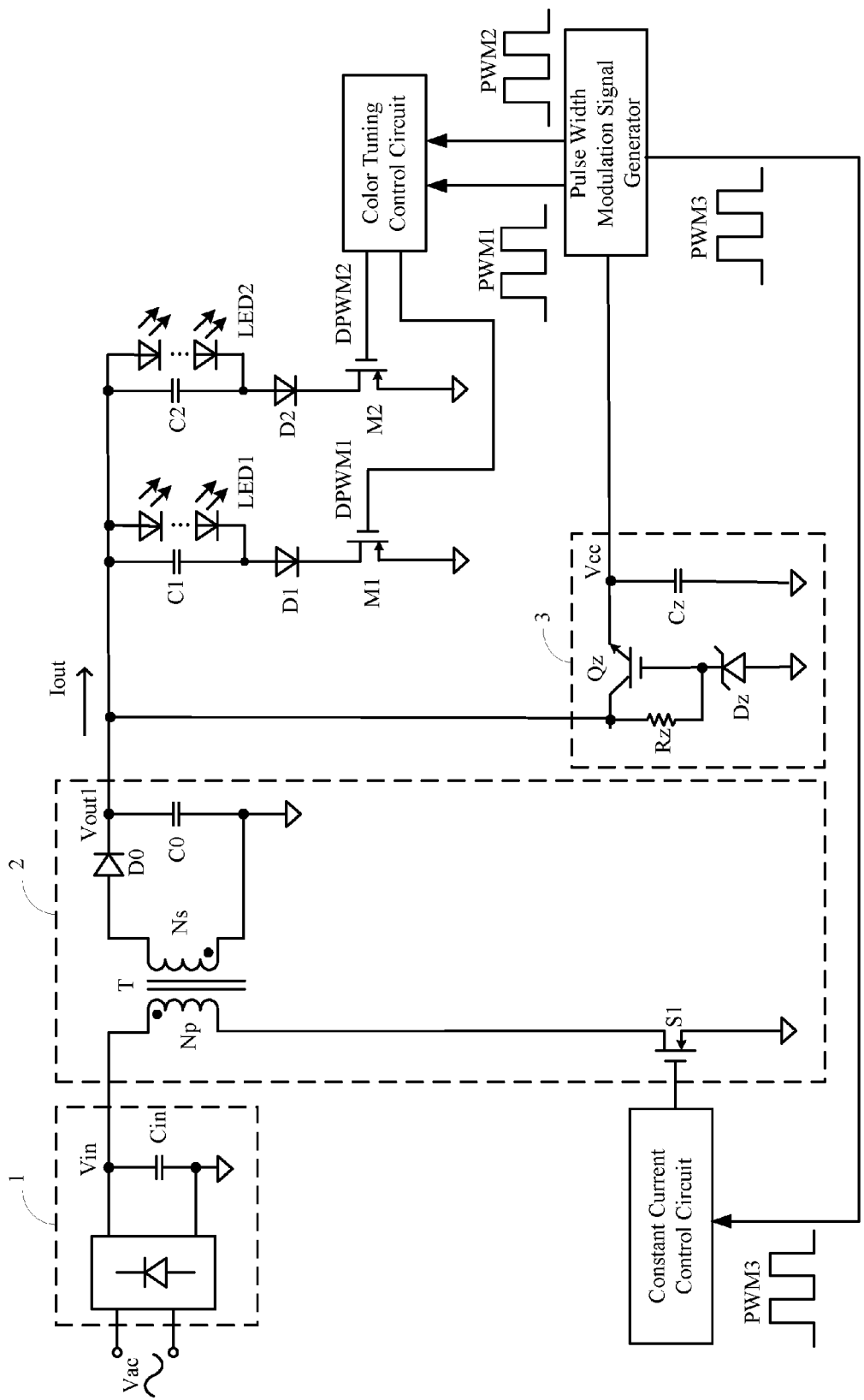
FIG. 2 is a schematic block diagram of an example LED driving circuit, in accordance with embodiments of the present invention.

Referring now to FIG. 2, shown is a schematic block diagram of an example LED driving circuit, in accordance with embodiments of the present invention. In this particular example, the LED driving circuit can drive an LED load that includes N LED strings, where N is a positive integer no less than 2. The LED driving circuit can include a power converter, a color tuning control circuit, a pulse width modulation signal generator, and N control switches that are respectively coupled in series to N LED strings.

The power converter can generate constant driving current Iout for the LED load. In this example, the LED driving circuit may also include a rectifier and filter circuit. Power converter 2 can include a power switch that is controlled by a constant current control circuit, such that power converter 2 may generate constant driving current Iout. The rectifier and filter circuit can receive AC voltage Vac, and may generate DC voltage Vin provided to power converter 2. Power converter 2 can convert DC voltage Vin to constant driving current Iout. For example, power converter 2 may be an isolated or non-isolated topology, whereby all ground terminals in power converter 2 are commonly coupled.

Power converter 2 can also include transformer T having primary winding Np and secondary winding Ns. Primary winding Np can connect to power switch S1, and a first output circuit may be coupled to secondary winding Ns for converting the energy stored in secondary winding Ns to driving current Iout. The constant current control circuit can control the turn on/off of power switch S1 such that the first output circuit may generate driving current Iout. For example, a constant driving current can be generated by using a constant current control circuit to control the switching operation of power switch S1 in power converter 2 is only an example but should not be deemed as limitation of the present invention. In another example, the constant current control circuit can control the constant current output based on a sampling signal obtained from a current through primary winding Np. The first output circuit may include diode D0 and capacitor C0. Diode D0 may have an anode coupled to an output terminal of secondary winding Ns, and a cathode coupled to ground via capacitor C0. Also, a common node of diode D0 and capacitor C0 can connect to the LED load for providing driving current Iout.

The LED load may include two or more parallel coupled LED strings having different color temperatures. For example, the LED load may include LED string LED1 having a cool color temperature, and LED string LED2 having a warm color temperature. Driving current Iout can be substantially equal to a sum of current Iled1 through LED string LED1, and current Iled2 through LED string LED2. The control switch may include control switch M1 coupled to LED string LED1 having a cool color temperature, and control switch M2 coupled to LED string LED2 having a warm color temperature.

In this example, the LED driving circuit can also include N output diodes respectively coupled between each LED string and each control switch, in order to prevent currents flowing from the control switches to the LED strings. In this case, the diodes can prevent the current flowing from the control switches to the LED strings. The output diodes may include output diode D1 coupled between LED string LED1 having a cool color temperature and control switch M1, and output diode D2 coupled between LED string LED2 having a warm color temperature and control switch M2. In addition, the LED driving circuit may include N output capacitors respectively coupled in parallel to N LED strings, in order to filter the current ripple in each LED string of the LED load. For example, the output capacitors may include output capacitor C1 coupled to LED string LED1 having a cool color temperature, and output capacitor C2 coupled to LED string LED2 having a warm color temperature.

The pulse width modulation signal generator can generate N color tuning pulse width modulation signals in order to control the color tuning control circuit to generate N switching control signals. This can be for controlling the switching operations of N control switches respectively, so as to regulate the ratio of each current through each LED string to the driving current, and to regulate the color temperature of the LED load. The pulse width modulation signal generator may be implemented by a programmable PWM chip or a single chip, or by a non-programmable PWM chip. Thus, the implementation of the pulse width modulation signal generator may not be limited to the particular example shown.

The number of the color tuning pulse width modulation signals may be related to the number of the LED strings of the LED load. For example, the LED load may include LED string LED1 having a cool color temperature, and LED string LED2 having a warm color temperature. The color tuning pulse width modulation signals may include pulse width modulation signals PWM1 and PWM2. The color tuning control circuit can generate switching control signals DPWM1 and DPWM2 according to pulse width modulation signals PWM1 and PWM2. Switching control signals DPWM1 and DPWM2 can be used to control the turn on/off of control switches M1 and M2. This can respectively regulate the ratios of current Iled1 of the LED string LED1, and current Iled2 of LED string LED2, to driving current Iout, so as to regulate the color temperature of the LED load.

Because the color tuning control circuit can receive color tuning pulse width modulation signals PWM1 and PWM2, and may generate switching control signals by regulating the high level voltages of color tuning pulse width modulation signals PWM1 and PWM2 to voltages required for driving control switches M1 and M2, the duty cycles of switching control signals DPWM1 and DPWM2 may be substantially equal to the duty cycles of color tuning pulse width modulation signals PWM1 and PWM2. That is, the duty cycles of the color tuning pulse width modulation signals and corresponding switching control signals may be the same, while the high level voltages may be different. The following will describe color tuning principles and procedures of this particular example LED driving circuit in conjunction with its operating waveform.

Voltage Vout1 at the output terminal of the driving current may be converted to a power supply voltage for the pulse width modulation signal generator via a power supply circuit, so the LED driving circuit may also include a power supply circuit 3. In this particular example, power supply circuit 3 can include transistor Qz, zener diode Dz, resistor Rz, and capacitor Cz. When voltage Vout1 is no less than the breakdown voltage of zener diode Dz, transistor Qz can be turned on, and voltage Vout1 can charge capacitor Cz via transistor Qz, so as to provide power supply voltage Vcc on capacitor Cz for the pulse width modulation signal generator. Zener diode Dz can protect the pulse width modulation signal generator when voltage Vout1 is too large.

Figure 3:
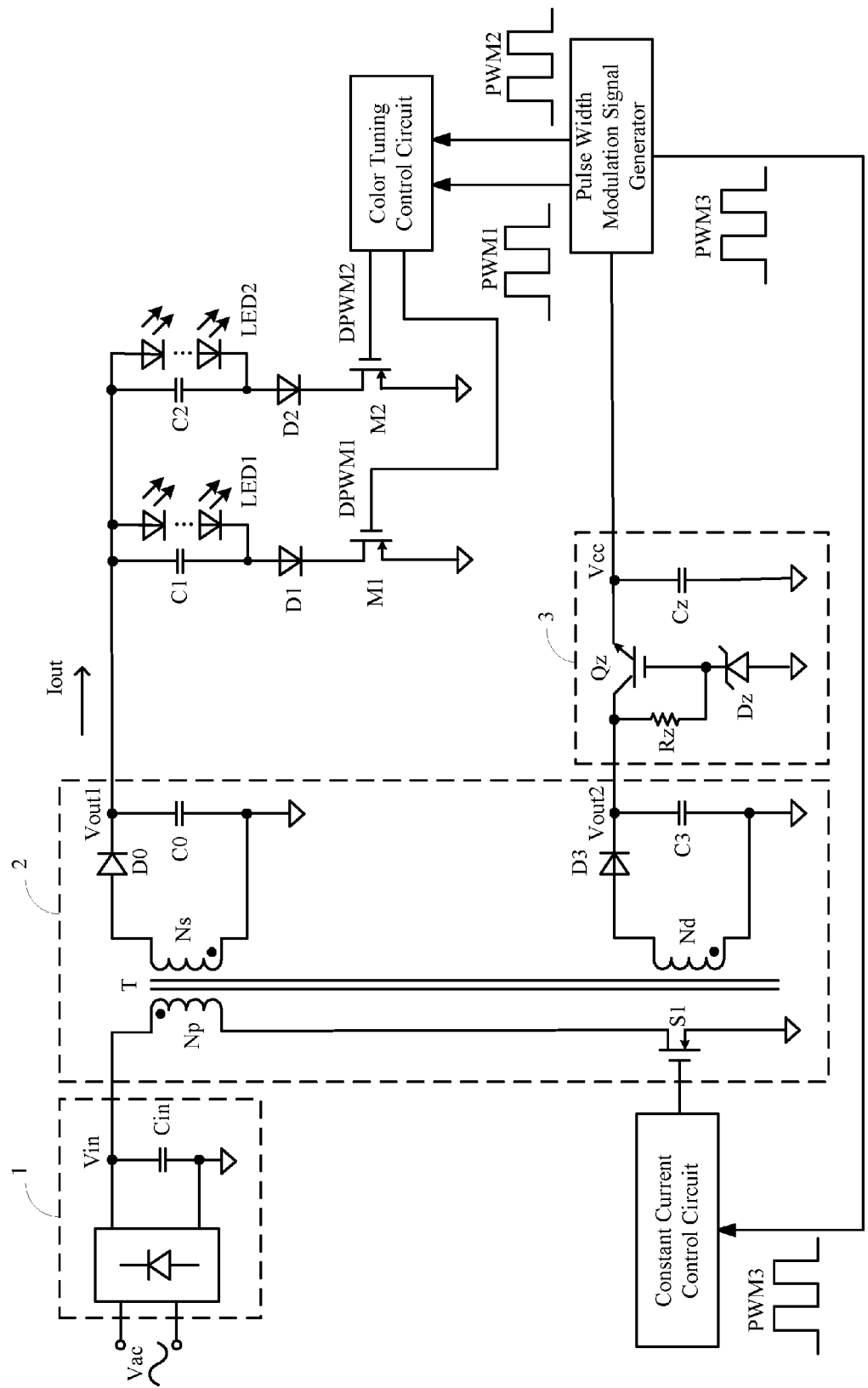
FIG. 3 is a schematic block diagram of another example LED driving circuit, in accordance with embodiments of the present invention.

Referring now to FIG. 3, shown is a schematic block diagram of another example LED driving circuit, in accordance with embodiments of the present invention. Here, the power supply voltage of the pulse width modulation signal generator can be generated in a different way from the LED driving circuit shown in FIG. 2. In this particular example, power converter 2 may additionally include secondary winding Nd and a second output circuit coupled to secondary winding Nd. The second output circuit can convert the energy stored in the second secondary winding to voltage Vout2. For example, the power supply circuit can provide a supply voltage for the pulse width modulation signal generator, and may receive voltage Vout2 rather than voltage Vout1 (see, e.g., FIG. 2).

As shown in the example of FIG. 3, the second output circuit may include diode D3 and capacitor C0. Diode D3 may have an anode coupled to an output terminal of the second secondary winding, and a cathode being coupled to ground via capacitor C3. A common node of diode D3 and capacitor C3 can be coupled to power supply circuit 3 for providing a supply voltage for the pulse width modulation signal generator. In this example, the power supply circuit can be implemented in substantially the same way as in the example of FIG. 2. The supply voltage for the pulse width modulation signal generator can be obtained by receiving input energy from the primary side via secondary winding Nd, and then converting the energy stored in secondary winding Nd to voltage Vout1 as an input voltage of the power supply circuit 3. In this way, the power supply generation can be optimized without being affected by a constant current output.

In the above described LED driving circuit, the pulse width modulation signal generator may also be used to generate dimming pulse width modulation signal PWM3 (see, e.g., FIGS. 2 and 3), which can be transmitted to the constant current control circuit (e.g., via a opto-coupler or directly). The constant current control circuit may regulate the brightness of the LED load by regulating driving current Iout according to the dimming pulse width modulation signal. The example LED driving circuits as described herein may also include a dimming function.

In addition, in the example LED driving circuitry, inductors or power switches that may be difficult to integrate besides the power converter may not be necessary because independent constant current driving circuits respectively coupled to each LED string can be avoided. A constant current control circuit on the primary side can control the driving current of the LED load as substantially constant. Also, a color temperature control circuit may regulate a ratio of a current through each LED string to the driving current, in order to achieve color tuning. Further, a constant current control circuit may regulate the driving current to achieve dimming.

In certain embodiments, the ground terminals of the constant current control circuit, the power switch, N control switches, power supply circuit, and the color tuning control circuit may be commonly coupled to the ground potential. Thus, the constant current control circuit, the power switch, N control switch, the power supply circuit, and the color tuning control circuit may be integrated in a single chip. In this way, both the color temperature and the brightness of the LED load may be regulated by one integrated chip, in order to improve the circuit integration level and to reduce the occupied size on a printed-circuit board (PCB). In addition, the ground terminals of the constant current control circuit and the power switch may be commonly coupled to a first ground potential, and ground terminals of N control switches, the power supply circuit and the color tuning control circuit may be commonly coupled to a second ground potential (e.g., that is different than the first ground potential).

Figure 4:
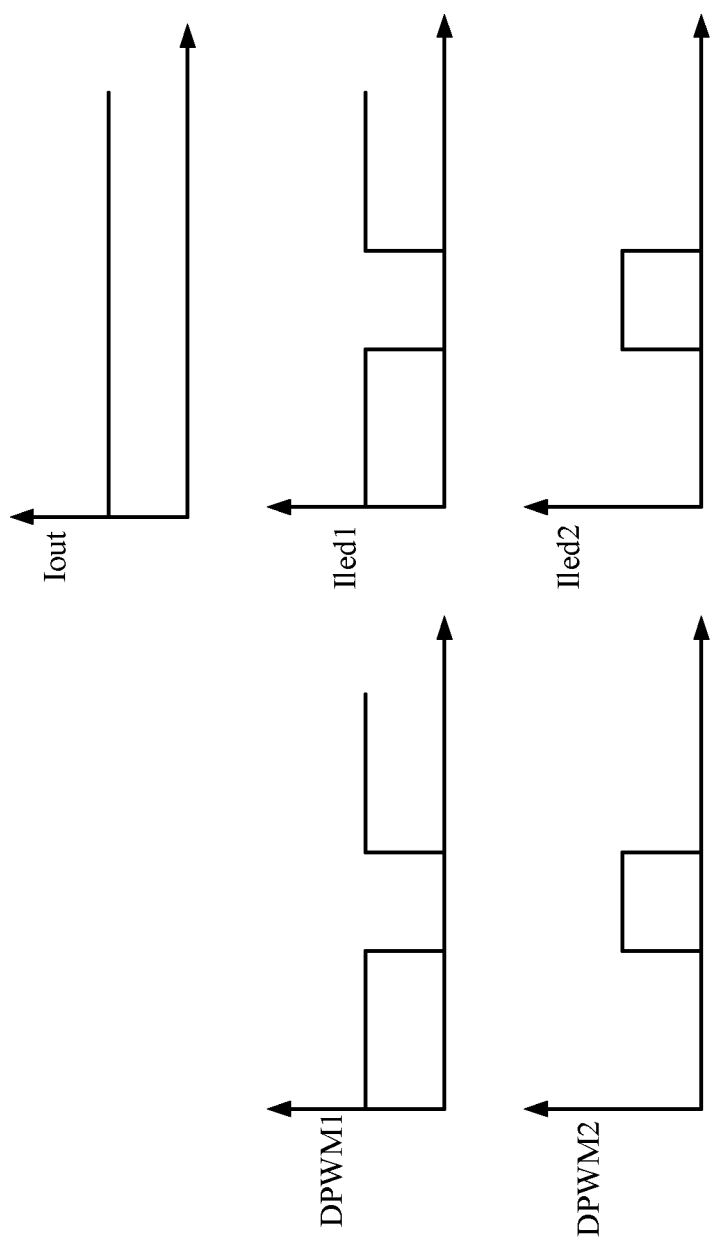
FIG. 4 is a waveform diagram of example operation of an LED driving circuit, in accordance with embodiments of the present invention.

Referring now to FIG. 4, shown is a waveform diagram of example operation of an LED driving circuit, in accordance with embodiments of the present invention. When the color temperature of the LED load is to be turned down, the pulse width modulation signal generator may generate color temperature pulse width modulation signal PWM1 with an increased duty cycle, and color temperature pulse width modulation signal PWM2 with a reduced duty cycle. Accordingly, switching control signal DPWM1 may have an increased duty cycle, and switching control signal DPWM2 may have a decreased duty cycle. Thus, the ratio of current Iled1 through LED string LED1 having a cool color temperature may increase, and the ratio of current Iled2 through LED string LED2 having a warm color temperature may decrease, so as to lower the color temperature of the LED load.

On the other hand, if switching control signal DPWM1 has a decreased duty cycle, and switching control signal DPWM2 has an increased duty cycle, the ratio of current Iled1 through LED string LED1 having a cool color temperature may decrease, and the ratio of current Iled2 through LED string LED2 having a warm color temperature may increase, so as to raise the color temperature of the LED load. As shown in FIG. 4, the duty cycles of Iled1 and Iled2 can respectively be equal to the duty cycles of the switching signals DPWM1 and DPWM2. Thus, the ratio of a current through each LED string to driving current Iout can be changed, so as to obtain a required color temperature.

Certain embodiments may also support a function of regulating the brightness of the LED load. When the brightness is to be regulated, the pulse width modulation signal generator may generate dimming pulse width modulation signal PWM3, and the constant current control circuit may accordingly regulate driving current Iout to realize dimming. For example, when the brightness of the LED load is to be turned up, the pulse width modulation signal generator may generate dimming pulse width modulation signal PWM3 with an increased duty cycle, and the constant current control circuit may control the power converter to generate an increased driving current Iout. Otherwise, the pulse width modulation signal generator may generate dimming pulse width modulation signal PWM3 with a decreased duty cycle, and the constant current control circuit may control the power converter to output decreased driving current Iout, so as to turn down the brightness of the LED load.

Thus, in certain embodiments, an LED driving circuit may provide a constant driving current for the LED load via a power converter. The color tuning control circuit may generate a group of switching control signals according to a group of color tuning pulse width modulation signals generated by the pulse width modulation signal generator. The switching control signals may control the switching operations of switches being coupled to a plurality of LED strings, so as to regulate the ratio of a current through each LED string to the driving current, in order to regulate the color temperature of the LED load. Also, the pulse width modulation signal generator may generate a dimming pulse width modulation signal for a constant current control circuit in order to regulate the driving current, such that the LED driving circuit also has a dimming function. The LED driving circuit may achieve brightness dimming and color tuning without providing independent constant current control circuits and constant current driving circuits for each LED string. Thus, the circuit structure may be simplified and integrated due to fewer peripheral components, which may result in a smaller circuit size and lower production costs.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:
1. A light-emitting diode (LED) driving circuit configured to drive an LED load comprising N LED strings, wherein N is a positive integer no less than 2, the LED driving circuit comprising:
   a) a power converter having a power switch;
   b) a constant current control circuit configured to control a switching operation of said power switch such that said power converter generates a driving current for said LED load;
   c) N control switches respectively coupled in series to said N LED strings;
   d) a pulse-width modulation (PWM) signal generator configured to generate N color tuning PWM signals; and
   e) a color tuning control circuit configured to receive said N color tuning PWM signals, and to generate N switching control signals to correspondingly control switching operations of said N control switches, in order to regulate a ratio of a current through each LED string of said LED load to said driving current, and to regulate the color temperature of said LED load.

2. The LED driving circuit of claim 1, wherein a first voltage at an output terminal of said driving current is configured to be converted to a supply voltage for said PWM signal generator via a power supply circuit.

3. The LED driving circuit of claim 1, wherein said power converter further comprises:
  a) a transformer having a primary winding and a first secondary winding, said primary winding being coupled in series to said power switch; and
  b) a first output circuit coupled to said first secondary winding, and being configured to convert the energy stored in said first secondary winding to said driving current.

4. The LED driving circuit of claim 3, wherein said power converter further comprises:
  a) a second secondary winding; and
  b) a second output circuit coupled to said second secondary winding, and being configured to convert the energy stored in said second secondary winding to a second voltage, wherein said second voltage is converted to a supply voltage for said PWM signal generator via a power supply circuit.

5. The LED driving circuit of claim 1, wherein said PWM signal generator is configured to output a dimming PWM signal, and said constant current control circuit is configured to control said switching operation of said power switch according to said dimming PWM signal, in order to regulate said driving current and a brightness of said LED load.

6. The LED driving circuit of claim 1, further comprising a rectifier and filter circuit configured to receive an AC voltage, and to generate a DC voltage provided to said power converter.

7. The LED driving circuit of claim 1, further comprising N output diodes coupled between said N LED strings and said N control switches, and being configured to prevent current flowing from said N control switches to said N LED strings.

8. The LED driving circuit of claim 1, further comprising N output capacitors coupled in parallel to said N LED strings.

9. The LED driving circuit of claim 1, wherein ground terminals of said constant current control circuit, said power switch, said N control switches, a power supply circuit and said color tuning control circuit are coupled to a same ground potential.

10. The LED driving circuit of claim 2, wherein:
  a) ground terminals of said constant current control circuit and said power switch are coupled to a first ground potential; and
  b) ground terminals of said N control switches, said power supply circuit, and said color tuning control circuit are coupled to a second ground potential.

11. The LED driving circuit of claim 1, wherein said N color tuning PWM signals have a same duty cycle as corresponding of said N switching control signals.

12. The LED driving circuit of claim 11, wherein said N color tuning PWM signals have a different high level voltage as corresponding of said N switching control signals.

13. The LED driving circuit of claim 1, wherein the color temperature of a first of said N LED strings is a cool color temperature, and the color temperature of a second of said N LED strings is a warm color temperature.

14. The LED driving circuit of claim 1, wherein said N switching control signals are directly connected to corresponding gates of said N control switches.

15. A method, comprising:
  a) controlling, by a constant current control circuit, a switching operation of a power switch of a power converter such that said power converter generates a driving current for an LED load, wherein said LED load comprises N LED strings, and wherein N is a positive integer no less than 2;
  b) generating, by a pulse-width modulation (PWM) signal generator, N color tuning PWM signals;
  c) receiving, by a color tuning control circuit, said N color tuning PWM signals;
  d) generating, by said color tuning control circuit, N switching control signals to correspondingly control switching operations of N control switches that are respectively coupled in series to said N LED strings; and
  e) regulating, by said N control switches, a ratio of a current through each LED string of said LED load to said driving current, and regulating the color temperature of said LED load.

16. The method of claim 15, wherein said N color tuning PWM signals have a same duty cycle as corresponding of said N switching control signals.

17. The method of claim 16, wherein said N color tuning PWM signals have a different high level voltage as corresponding of said N switching control signals.

18. The method of claim 15, wherein the color temperature of a first of said N LED strings is a cool color temperature, and the color temperature of a second of said N LED strings is a warm color temperature.

19. The method of claim 15, wherein said N switching control signals are directly connected to corresponding gates of said N control switches.

20. The method of claim 15, further comprising:
  a) generating, by said PWM signal generator, a dimming PWM signal; and
  b) controlling, by said constant current control circuit, said switching operation of said power switch according to said dimming PWM signal, for regulating said driving current and a brightness of said LED load.

* * * * *